United States Patent [19]
Gibb

[11] Patent Number: 5,628,350
[45] Date of Patent: May 13, 1997

[54] INFLATING DEVICE

[75] Inventor: Robert F. Gibb, San Diego, Calif.

[73] Assignee: Raptor, Inc., San Diego, Calif.

[21] Appl. No.: 502,310

[22] Filed: Jul. 13, 1995

[51] Int. Cl.$^6$ ............................................. B65B 1/04
[52] U.S. Cl. .................... 141/38; 141/19; 222/5
[58] Field of Search ................ 141/38, 19, 197; 222/5, 396; 128/205.24, 203.21, 205.21; 137/318

[56] References Cited

U.S. PATENT DOCUMENTS

| | | | |
|---|---|---|---|
| 4,694,850 | 9/1987 | Fumino | 137/318 |
| 4,867,209 | 9/1989 | Santoiemmo | 141/19 |
| 4,969,493 | 11/1990 | Lee | 141/38 |
| 5,287,906 | 2/1994 | Stech | 141/38 |
| 5,316,055 | 5/1994 | Brimmer | 141/38 |

*Primary Examiner*—Henry J. Recla
*Assistant Examiner*—Steven O. Douglas
*Attorney, Agent, or Firm*—William Patrick Waters

[57] ABSTRACT

A tire inflation device for delivering a fluid, such as carbon dioxide, from a liquid gas cartridge to a pneumatic tire wherein the device has a capability of controlling inflation to enable the user to achieve a preset desired tire pressure. A cartridge activating mechanism is provided. A cartridge securing mechanism is provided which prevents removal of an activated, unspent cartridge from the inflating device.

9 Claims, 2 Drawing Sheets

INFLATING DEVICE

FIELD OF INVENTION

This invention relates generally to devices used for inflating fluid retaining vessels and, more particularly, to devices for inflating pneumatic tires.

BACKGROUND ART

Pneumatic tires are ubiquitous in modern society. They are found in virtually all parts of the world on automobiles, trucks, bicycles and a host of other conveyances. It goes without saying that loss of air from a tire impairs vehicular function and, in many cases, requires tire repair or replacement.

In some cases, it is desirable to have a capability for inflating a flat tire without removing it from its rim. Such a capability is of significant value if the tire goes flat at some place remote from a repair facility. Thus, a need exists for a technique for inflating a flat tire, in the field, without requiring employment of a tire repair shop. Conventional devices have been developed to address the need. In using such devices, it is important to avoid overinflating the tire. On the other hand, it would be desireable to have a tire inflating device which could inflate a tire safely to a suitable pressure.

In this regard, for example, reference may be made to U.S. Pat. Nos. 2,812,783; 3,448,779; 3,834,433; 4,054,163; 4,168,015; 4,489,855; 4,773,454; 4,969,493; 5,012,954; 5,316,055 and 5,386,857.

While the inventions disclosed in the above mentioned patents have some utility, they are generally inefficient in use and, in at least some cases, have no mechanism for preventing underinflation or overinflation of the tire. Thus, a need exists for an inflating device which is simple to use and which permits the user to inflate a pneumatic tire in a controlled manner so as to avoid overinflating or underinflating the tire. Since inflating devices utilize gas under pressure, it would be desirable to have such an inflating device which enabled use thereof in a safe manner.

DISCLOSURE OF THE INVENTION

It is an object of the present invention to provide a tire inflating device which can inflate a tire in a controlled manner while substantially eliminating the problems of tire overinflation and underflation.

It is a further object of the present invention to provide a tire inflating device which is portable and easily stored in an automobile or on a bicycle frame.

It is a still further object of the present invention to provide a tire inflating device which is safe to use and, in addition, can be safely stored when it is not in use.

Briefly, the above and further objects of the present invention are realized by providing a tire inflation device for delivering a fluid, such as carbon dioxide, from a liquid gas cartridge to a pneumatic tire wherein the device has a capability of controlling inflation to enable the user to achieve a preset desired tire pressure. A cartridge activating mechanism is provided. A cartridge securing mechanism is provided which prevents removal of an activated, unspent cartridge from the inflating device.

The present invention affords several advantages. A significant advantage is that the device permits the user to select a desired tire pressure while eliminating the need for a separate tire gauge to measure tire pressure.

Another advantage of the present invention is that, because of the cartridge securing mechanism, separation of an activated, unspent cartridge from the inflating device is prevented.

BRIEF DESCRIPTION OF THE DRAWINGS

The above mentioned and other objects and features of this invention and the manner of attaining them will become apparent and the invention it self will be best understood by reference to the following description of the embodiment of the invention in conjunction with the accompanying drawings, wherein.

BEST MODE FOR CARRYING OUT THE INVENTION

Figure 1:
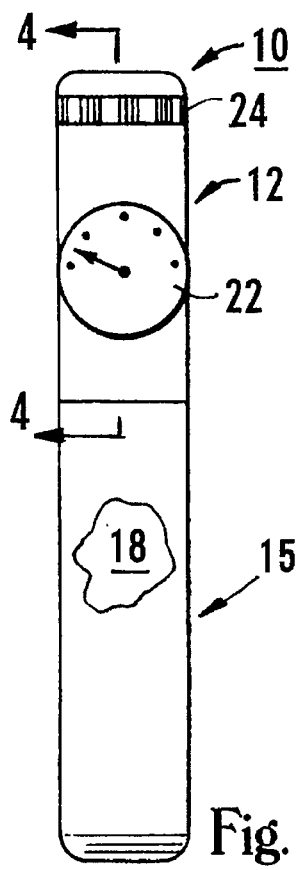
FIG. 1 is an orthographic front view of the present invention.
Figure 2:
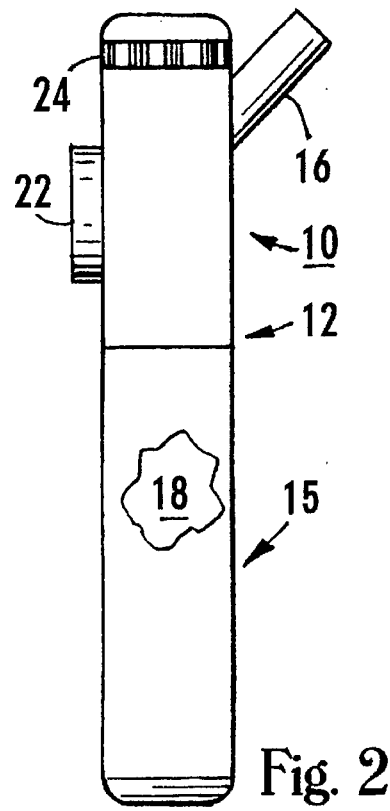
FIG. 2 is an orthographic side view of the present invention.
Figure 3:
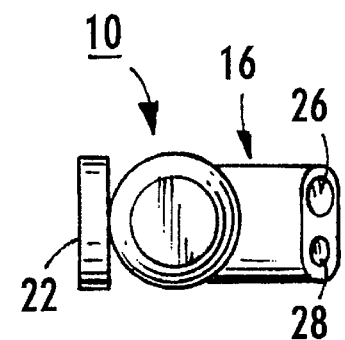
FIG. 3 is an interior view of a portion of the present invention.
Figure 4:
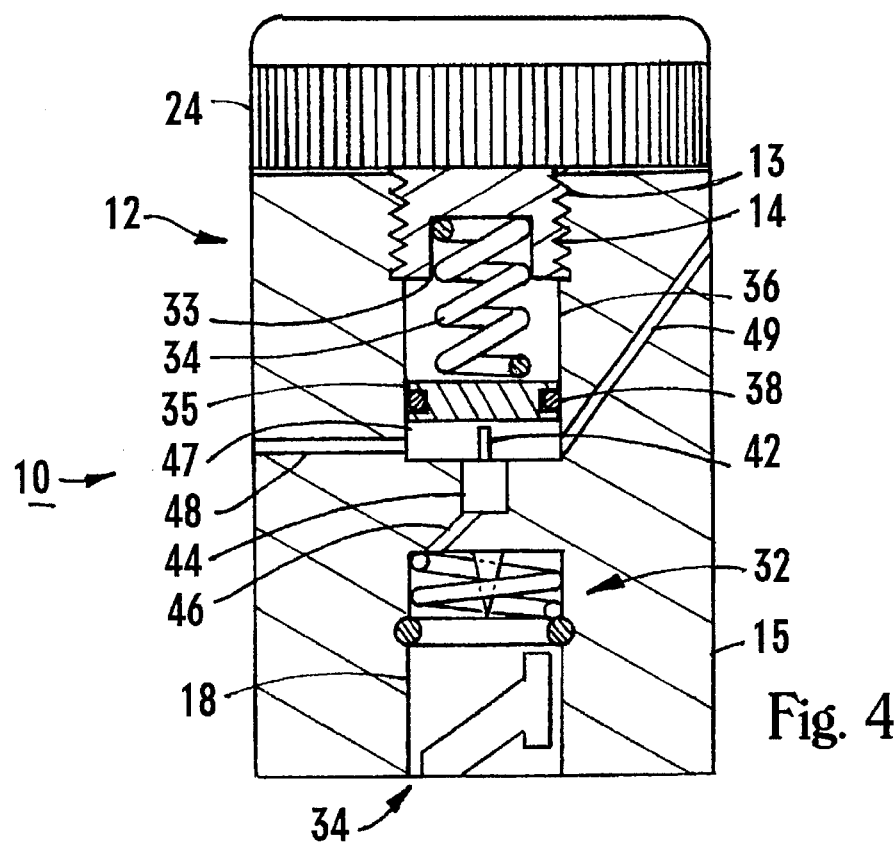
FIG. 4 is a view taken along the line 4—4 of FIG. 1

Referring now to the drawings and particularly FIGS. 1–3, there is shown a novel inflating device 10 which is constructed according to the present invention. The device 10 is comprised generally of a gas pressure regulator housing 12, a cartridge containing housing 15 and a gas delivery chuck 16. In operation, a cartridge 18 containing a fluid under pressure, such as carbon dioxide, is secured within the device 10 and activated, both in a manner more fully discussed below.

A pressure adjust knob 24 includes a threaded portion 13 which engages a threaded portion 14 in the housing 12. The threaded portion 13 of the knob 24 includes a recess 33. A spring 34 is disposed partially within the recess 33 from which it extends opposite the knob 24 through a cylinder 36 to engage a piston 35. An O-ring seal 38 is interposed between the cylinder 36 and the piston 35. As the knob 24 is turned, it moves into and out of the housing 12 and, in the process, moves the piston 35 according to the amount of compression exerted against the spring 34. Movement of the piston 35, within the cylinder 36, changes the volume of a chamber 47. This chamber is in fluid communication with a port 48 which connects to a pressure gauge 22 and with a second port 49 which connects fluidly with the gas delivery chuck 16.

A valve 44, normally closed, is disposed at the bottom of the cylinder 36 and in fluid communication with the chamber 47. In addition, the valve is fluidly connected to the cartridge 18 by a port 46. A rod 42 connects the piston 35 and the valve 44 to open the valve and to allow fluid flow as the spring 34 urges the piston 35 downwardly. In this regard, pressure from the spring 34 causes the piston 35 to move downwardly, and in turn, to move the rod 42 to open the valve 44 to permit fluid flow from the cartridge 18.

When the valve 44 is opened, fluid flows from the cartridge 18 into the chamber 47 to increase chamber pressure. Chamber pressure increases until it is sufficient to overcome the force on the piston 35 exerted by the spring 34. At this time, the piston 35 moves up until the valve 44 closes.

It will be recognized that, because the ports 48 and 49 fluidly communicate with the chamber 47, gas pressure on the gauge 22 and in the gas delivery chuck 16, respectively, will always be the same as chamber pressure. Thus, if greater pressure to the gas delivery chuck 16 is desired, the adjusting knob 24 is screwed further into the housing 12 to increase spring force on the piston 35, thereby requiring more gas pressure to raise the piston 35 to shut off the valve 44.

When gas is allowed to flow through the gas delivery chuck 16, the pressure in the chamber 47 is reduced and the piston 35 moves downwardly, thereby opening the valve 44 and allowing more gas to flow from the cartridge 18. In this manner, when the tire pressure reaches a desired preset pressure, the piston 35 moves up to shut the valve 44. At this condition, the tire pressure is the regulator set pressure.

In use, desired tire pressure is set by rotation of the knob 24 until a desired setting on the pressure gauge 22 is achieved. Inflating gas is delivered from the gas delivery chuck 16 to either a SCHRADER valve 26 or a PRESTA type inflation valve delivery chuck 16 to either a SCHRADER valve 26 or a PRESTA type inflation valve 28. These valves are in a normally closed condition, opening when engaging a tire valve stem (not shown).

Figure 8:
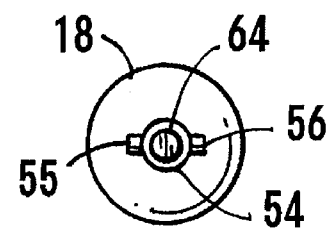
FIG. 8 is a top plan view of a cartridge.
Figure 7:
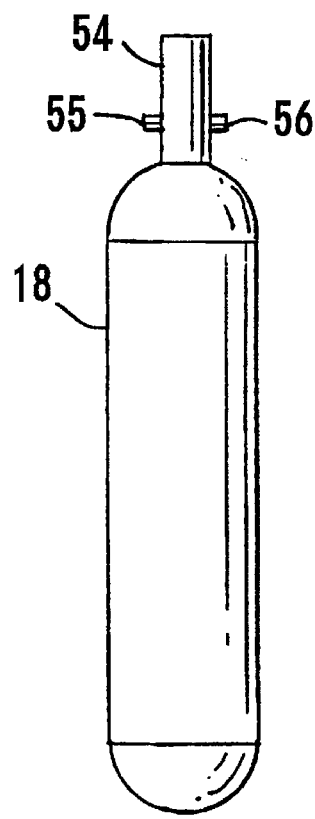
FIG. 7 is an orthographic view of a cartridge.

Referring now to FIGS. 7 and 8 there is shown the cartridge 18 of the present invention. The cartridge 18 includes a neck 54 which is sealed by a seal 64. Radially disposed pins 55 and 56, located opposite one another, extend from the neck 54.

Figure 5:
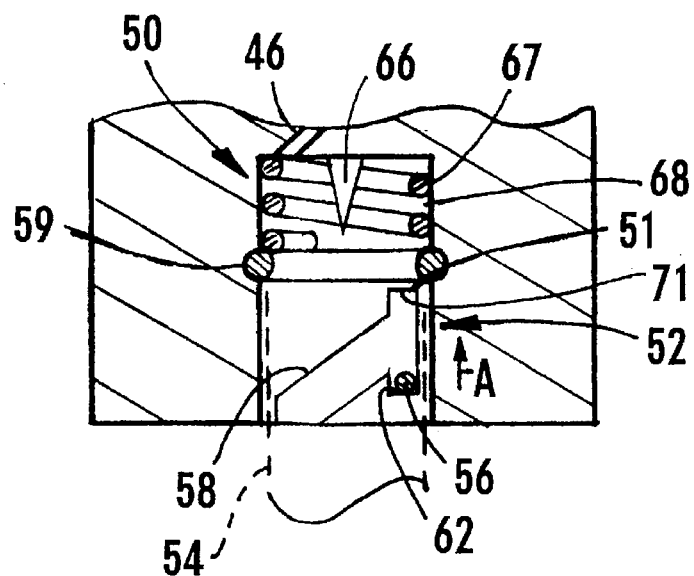
FIG. 5 is a semidiagrammatic view of a portion of the present invention depicting the cartridge securing mechanism.
Figure 6:
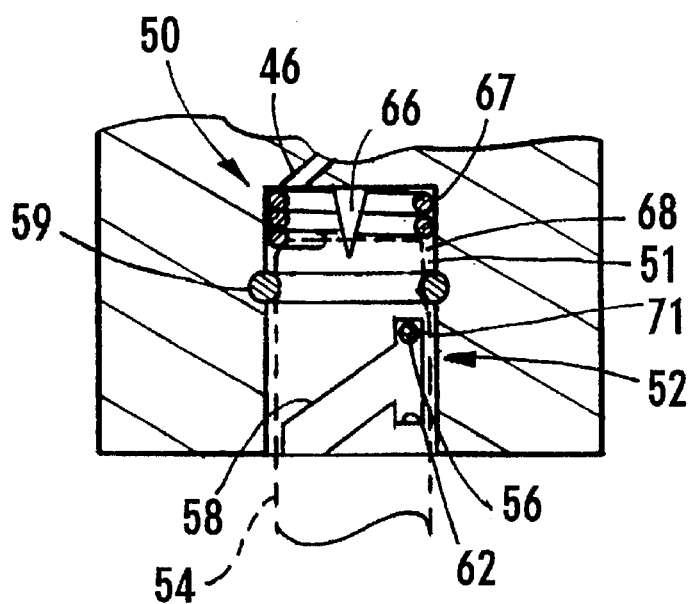
FIG. 6 is a semidiagrammatic view of a portion of the present invention depicting cartridge activation.

Considering now a cartridge activating mechanism 50 and a cartridge securing mechanism 52 of the present invention, in FIG. 5, the cartridge activating mechanism 50 is shown as not activated while in FIG. 6 the mechanism is activated and a spike 66 has punctured the seal 64. The mechanism 50 comprises an elongated cartridge receptacle 51 located within the cartridge housing 15 into which the neck 54 extends where it contacts an O-ring seal 59. In the cartridge inactive condition, a spring 67 holds the spike 66 away from the seal 64.

To aid in understanding further the cartridge activating mechanism 50, it will be worthwhile at this time to analyze the cartridge securing mechanism 52. This mechanism includes a pair of slots, such as the slot 58 formed in the inner wall of the cartridge receptacle 51 and inclined at an angle to the axis. The slot 58 is disposed opposite an identical slot (not shown) also formed in the wall of the cartridge receptacle 51. In use, the cartridge 18 is inserted into the receptacle 51 so that the pin 56 slides along the slot 58. It will be understood that the pin 56 is engaging an identical slot (not shown) on the opposite side of the neck 54. As the cartridge 18 is inserted, a rotational movement allows the pin 56 to slide along the slot 58 until the pin reaches a crest of the slot and the pin 58 drops into a detent 62. It will be recognized that, although not shown, the pin 55 moves along a corresponding slot and falls, simultaneously, into a similar detent.

After cartridge 18 insertion has been accomplished, the cartridge is held securely within the receptacle 51 but the seal 64 has not been broken since it has not moved far enough in to reach the piercing spike 66. To pierce the cartridge seal, the cartridge 18 must be thumped down on a solid surface. When this is done, the cartridge 18 is driven in a direction shown by the arrow A into the position shown in FIG. 6. The pin 55 and its counterpart (not shown) move upwardly from their respective detents and into a recess, such as the recess 71 into which the pin 56 moves. At this point, the seal 64 is penetrated by the spike 66 and fluid under pressure fills a space 68 above the cartridge neck 54. The area of the neck 54 facing the gas under pressure acts as a piston and the cartridge 18 is driven down to the position shown in FIG. 5 where it is held by gas pressure. Thus, while the cartridge 18 contains fluid under pressure, the force of the gas pressure makes it difficult to urge the cartridge far enough into the cartridge receptacle 51 to permit the pins 55 and 56 to clear their respective detents. In this manner, removal of an activated, unspent cartridge is prevented.

The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of all the claims are to be embraced within their scope.

What is claimed is:

1. In an apparatus for delivering fluid under pressure to a fluid retaining vessel, the apparatus being of the type which utilizes a cartridge containing a fluid under pressure and the cartridge includes a neck having an opening formed therein for dispensing fluid therethrough, the neck having a seal to retain the fluid within the cartridge, the combination comprising:

a first cylinder for housing the cartridge, said first cylinder including means for piercing the cartridge neck seal for dispensing fluid from said cartridge and further including means for receiving the dispensed fluid;

means for regulating the pressure of the dispensed fluid, said regulating means including a second cylinder in axial alignment with said first cylinder, said second cylinder having a piston disposed for axial movement therewithin whereby a fluid pressure chamber is formed between said piston and the bottom of said second cylinder, the volume of said chamber being defined by the location of said piston within said second cylinder, said regulating means further including fluid coupled port means extending from a location inside said fluid pressure chamber externally of said regulating means to connect fluidly to the fluid retaining vessel to equalize fluid pressure in said vessel with fluid pressure in said chamber;

valve means disposed between said first cylinder fluid receiving means and said fluid pressure chamber for controlling fluid flow therebetween;

means for adjusting pressure in said fluid pressure chamber, said means for adjusting pressure including valve opening means disposed between said piston and said valve means; and spring means, abutting said piston opposite said valve opening means, whereby said spring means controls movement of said piston within said second cylinder to alter the volume of said fluid pressure chamber, thereby adjusting the fluid pressure therewithin, wherein said second cylinder includes an interior threaded wall portion and spring compressing means including an exterior threaded wall portion for engaging said interior threaded wall portion, said compressing means being in contact with said spring means at an end thereof, opposite said piston, whereby movement of said compressing means changes the compression of said spring means.

2. The apparatus according to claim 1, including a pressure gauge and second port means, said second port means being fluidly connected between said gauge and said fluid pressure chamber.

3. The apparatus according to claim 1, including chuck means for connecting said port means to said pressure retaining vessel.

4. The apparatus according to claim 1 including means for preventing separation of the cartridge from said pressure regulating means when the cartridge has been pierced and the cartridge contains fluid under pressure.

5. The apparatus according to claim 1 wherein said second chamber includes sealing means for preventing leakage therefrom of fluid under pressure.

6. In an apparatus for delivering fluid under pressure to a fluid retaining vessel, the combination comprising:

a cartridge containing a fluid under pressure, said cartridge including a neck extending therefrom, said neck having an opening formed therein for dispensing fluid therethrough, said neck further having a seal for retaining fluid within said cartridge;

a first cylinder for housing the cartridge, said first cylinder including means for piercing the cartridge neck seal for dispensing fluid from said cartridge and further including means for receiving the dispensed fluid;

means for regulating the pressure of the dispensed fluid, said regulating means including a second cylinder in axial alignment with said first cylinder, said second cylinder having a piston disposed for axial movement therewithin whereby a fluid pressure chamber is formed between said piston and the bottom of said second cylinder, the volume of said chamber being defined by the location of said piston within said second cylinder, said regulating means further including fluid coupled port means extending from a location inside said fluid pressure chamber externally of said regulating means to connect fluidly to the fluid retaining vessel to equalize fluid pressure in said vessel with fluid pressure in said chamber;

valve means disposed between said first cylinder fluid receiving means and said fluid pressure chamber for controlling fluid flow therebetween;

means for adjusting pressure in said fluid pressure chamber, said means for adjusting pressure including valve opening means disposed between said piston and said valve means;

spring means, abutting said piston opposite said valve opening means, whereby said spring means controls movement of said piston within said second cylinder to alter the volume of said fluid pressure chamber, thereby adjusting the fluid pressure therewithin; and means for retaining said cartridge within said first chamber, said means including pin receiving means disposed in the inner wall of said first cylinder and pin means extending radially from said cartridge means for engaging said pin receiving means, wherein said second cylinder includes an interior threaded wall portion and spring compressing means including an exterior threaded wall portion for engaging said interior threaded wall portion, said compressing means being in contact with said spring means at an end thereof, opposite said piston, whereby movement of said compressing means changes the compression of said spring means.

7. The apparatus according to claim 6 wherein said pin receiving means is a slot formed in the wall of said first cylinder and said pin means include a plurality of pins extending radially from the neck of said cartridge.

8. A method of controlling fluid pressure in a fluid retaining vessel, the steps comprising:

providing a vessel inflating apparatus having a cartridge containing a fluid under pressure, said cartridge including a neck extending therefrom, said neck having an opening formed therein for dispensing fluid therethrough, said apparatus further having a first cylinder for receiving said cartridge and a second cylinder, axially aligned with said first cylinder, said second cylinder having means for regulating the pressure of the dispensed fluid, said regulating means including a cylinder having a piston disposed for axial movement therewithin whereby a fluid pressure chamber is formed between said piston and the bottom of said cylinder, the volume of said chamber being defined by the location of said piston within said cylinder, said regulating means further including fluid coupled port means extending from a location inside said fluid pressure chamber externally of said regulating means to connect fluidly to the fluid retaining vessel to equalize fluid pressure in said vessel with fluid pressure in said chamber, valve means in fluid communication between said cartridge and said fluid pressure chamber for controlling fluid flow therebetween, means for adjusting pressure in said fluid pressure chamber, said means for adjusting pressure including valve opening means disposed between said piston and said valve means, spring means, abutting said piston opposite said valve opening means, whereby said spring means controls movement of said piston within said cylinder to alter the volume of said fluid pressure chamber, thereby adjusting the fluid pressure therewithin, wherein said second cylinder includes an interior threaded wall portion and spring compressing means including an exterior threaded wall portion for engaging said interior threaded wall portion, said compressing means being in contact with said spring means at an end thereof, opposite said piston, whereby movement of said compressing means changes the compression of said spring means;

operating said adjusting means to select a suitable pressure in said fluid pressure chamber;

connecting said port means to said pressure retaining vessel; and flowing fluid under pressure from said fluid pressure chamber to said vessel.

9. A method according to claim 8 wherein operating said adjusting means includes the step of changing the pressure within said fluid pressure chamber.

* * * * *